US012562387B2

(12) United States Patent
Ji et al.

(10) Patent No.: US 12,562,387 B2
(45) Date of Patent: Feb. 24, 2026

(54) POSITIVE ELECTRODE PLATE, PREPARATION METHOD THEREFOR AND USE THEREOF

(71) Applicant: SVolt Energy Technology Co., Ltd., Changzhou (CN)

(72) Inventors: Xing Ji, Jiangsu (CN); Bing Zhang, Jiangsu (CN); Jing Liu, Jiangsu (CN)

(73) Assignee: SVolt Energy Technology Co., Ltd., Changzhou (CN)

( * ) Notice: Subject to any disclaimer, the term of this patent is extended or adjusted under 35 U.S.C. 154(b) by 773 days.

(21) Appl. No.: 17/785,897

(22) PCT Filed: Nov. 18, 2020

(86) PCT No.: PCT/CN2020/129682

§ 371 (c)(1),
(2) Date: Jun. 15, 2022

(87) PCT Pub. No.: WO2021/238100

PCT Pub. Date: Dec. 2, 2021

(65) Prior Publication Data

US 2023/0032775 A1 Feb. 2, 2023

(30) Foreign Application Priority Data

May 29, 2020 (CN) ......................... 202010474733.4

(51) Int. Cl.

| | |
|---|---|
| ***H01M 4/505*** | (2010.01) |
| ***H01M 4/04*** | (2006.01) |
| ***H01M 4/485*** | (2010.01) |
| ***H01M 4/525*** | (2010.01) |
| ***H01M 4/62*** | (2006.01) |
| ***H01M 4/66*** | (2006.01) |
| ***H01M 10/0525*** | (2010.01) |
| *H01M 4/02* | (2006.01) |

(52) U.S. Cl.

CPC ......... *H01M 4/622* (2013.01); *H01M 4/0404* (2013.01); *H01M 4/485* (2013.01); *H01M 4/505* (2013.01); *H01M 4/525* (2013.01); *H01M 4/625* (2013.01); *H01M 4/661* (2013.01); *H01M 10/0525* (2013.01); *H01M 2004/028* (2013.01)

(58) Field of Classification Search

CPC .... H01M 4/622; H01M 4/0404; H01M 4/485; H01M 4/505; H01M 4/525; H01M 4/625; H01M 4/661; H01M 10/0525; H01M 2004/028

See application file for complete search history.

(56) References Cited

U.S. PATENT DOCUMENTS

| | | | | |
|---|---|---|---|---|
| 2007/0236768 A1 | 10/2007 | Kawahara et al. | | |
| 2011/0281161 A1* | 11/2011 | Ikeda | ................ | H01M 10/0525 429/211 |
| 2018/0219212 A1* | 8/2018 | Seol | ...................... | H01M 4/364 |
| 2018/0233734 A1* | 8/2018 | Ahn | ...................... | H01M 4/625 |
| 2020/0127291 A1* | 4/2020 | Otsuka | .............. | H01M 10/0525 |
| 2020/0176782 A1* | 6/2020 | Isshiki | ................ | H01M 4/0404 |

FOREIGN PATENT DOCUMENTS

| | | |
|---|---|---|
| CN | 101454929 A | 6/2009 |
| CN | 105390742 A | 3/2016 |
| CN | 106033824 A | 10/2016 |
| CN | 106328925 A | 1/2017 |
| CN | 103872373 B | 3/2017 |
| CN | 106536580 A | 3/2017 |
| CN | 107710471 A | 2/2018 |
| CN | 108039449 A | 5/2018 |
| CN | 108110215 A | 6/2018 |
| CN | 108276937 A | 7/2018 |
| CN | 106299377 B | 10/2018 |
| CN | 109713280 A | 5/2019 |
| CN | 109786832 A | 5/2019 |
| CN | 110383547 A | 10/2019 |
| CN | 110870103 A | 3/2020 |
| CN | 111082062 A | 4/2020 |
| CN | 111092264 A | 5/2020 |
| CN | 111094371 A | 5/2020 |
| CN | 111095611 A | 5/2020 |
| CN | 111509232 A | 8/2020 |
| CN | 108400335 B | 7/2021 |

(Continued)

OTHER PUBLICATIONS

International Search Report dated Mar. 3, 2021, in connection with International Application No. PCT/CN2020/129682.
Chinese Office Action dated Nov. 17, 2021, in connection with Chinese Application No. 202010474733.4.
Chinese Office Action dated May 7, 2022, in connection with Chinese Application No. 202010474733.4.
Le et al. Sol-Gel Synthesis of Bismuth Molybdate Catalysts for the Selective Oxidation of Propylene to Acrolein: Influence of pH Value and Theoretical Molar Atomic Ratio. Journal of the Chinese Chemical Society. Aug. 8, 2017. 7 pages.
Japanese Notice of Reasons for Refusal dated May 15, 2023, in connection with Japanese Patent Application No. 2022-521170.

(Continued)

*Primary Examiner* — James Lee
(74) *Attorney, Agent, or Firm* — Wolf, Greenfield & Sacks, P.C.

(57) ABSTRACT

Disclosed are a positive electrode plate, a preparation method therefor and the use thereof. The positive electrode plate comprises a current collector and an active substance layer formed on the current collector, wherein the active substance layer comprises a positive electrode active material, a conductive agent and a binder, with the binder comprising a polymer with the structural formula as shown in formula I, which polymer comprises chain segments a, b and c. The positive electrode plate not only has a low preparation cost, but can also significantly improve the high-temperature storage and high-temperature cycle performance of a lithium-ion battery.

8 Claims, No Drawings

(56) References Cited

FOREIGN PATENT DOCUMENTS

| | | | |
|---|---|---|---|
| EP | 3 240 069 | A1 | 11/2017 |
| EP | 3 331 072 | A1 | 6/2018 |
| GB | 1 269 253 | A | 4/1972 |
| JP | S5425964 | A | 2/1979 |
| JP | 2003-132893 | A | 5/2003 |
| JP | 2004-063423 | A | 2/2004 |
| JP | 2018-160421 | A | 10/2018 |
| JP | 2018-530113 | A | 10/2018 |
| KR | 20190064012 | A | 6/2019 |
| TW | 519777 | B | 2/2003 |
| WO | 2017/002361 | A1 | 1/2017 |
| WO | 2017/056488 | A1 | 4/2017 |
| WO | 2019/021891 | A1 | 1/2019 |
| WO | 2021/141376 | A1 | 7/2021 |

OTHER PUBLICATIONS

Honghe et al., Compatibility of Ionic Liquid Electrolyte with Carbonaceous anodes in Li-ion Batteries.

Yilmaz et al., Functional Defective Metal-Organic Coordinated Network of Mesostructured Nanoframes for Enhanced Electrocatalysis. Advanced Functional Materials. 2017. 9 pages.

Extended European Search Report dated Sep. 6, 2023, in connection with European Application No. 20937972.6.

Database WPI Week 200344. Thomson Scientific. AN 2003-468326. XP002810029.

* cited by examiner

POSITIVE ELECTRODE PLATE, PREPARATION METHOD THEREFOR AND USE THEREOF

CROSS-REFERENCE TO RELATED APPLICATIONS

This Application is a national stage filing under § 35 U.S.C. 371 of International Patent Application Serial No. PCT/CN2020/129682, filed Nov. 18, 2020, entitled "POSITIVE ELECTRODE PLATE, PREPARATION METHOD THEREFOR AND USE THEREOF", which claims priority to Chinese application serial no. 202010474733.4 filed May 29, 2020. The contents of each of these applications are incorporated herein by reference in their entireties.

TECHNICAL FIELD

The present disclosure relates to the field of lithium batteries, for example, to a positive electrode plate, a preparation therefor, and use thereof.

BACKGROUND

Lithium-ion batteries have been widely used in mobile phones, notebook computers, new energy vehicles, and other fields because of their advantages such as high energy density, good rate capability, and long cycle life. The positive electrode materials of lithium batteries, such as $LiCoO_2$, $LiNi_{1-x-y}Co_xMn_yO_2$ (ternary materials), and other low-cobalt or cobalt-free materials, include transition metals. During the use of batteries, especially in a high-temperature environment, the transition metals are easily dissolved from the positive electrode, migrate through the electrolyte, and deposit to the negative electrode, resulting in the performance degradation of lithium batteries. The positive electrode plate of lithium batteries usually includes a positive electrode material, a binder, a conductive agent, and a current collector, and at present, the commonly used method to inhibit the dissolution of metals from the positive electrode material is the modification of the positive electrode material. One modification method is surface coating, but the electrolyte has a certain corrosion effect on the surface coating layer, which will cause the failure of the coating layer. Another modification method is material gradient design, but the process of the material gradient design is complex and the cost is high. Therefore, the method for ameliorating the dissolution of metals from the positive electrode in a high-temperature environment needs to be further improved.

SUMMARY

The summary of the subject matter described herein is given below in detail. This summary is not intended to limit the scope of the claims.

The present disclosure provides a positive electrode plate, a preparation method therefor, and use thereof.

The present disclosure provides a positive electrode plate in an embodiment. The positive electrode plate includes a current collector and an active substance layer formed on the current collector, wherein the active substance layer includes a positive electrode active material, a conductive agent, and a binder, the binder includes a polymer having a structural formula as shown in Formula I, and the polymer includes a chain segment a, a chain segment b, and a chain segment c, Formula I

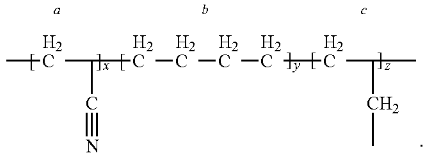

In an embodiment provided by the present disclosure, the positive electrode plate can slow down the occurrence of side reactions at the interface of the positive electrode during high-temperature storage and high-temperature cycling, thereby improving the high-temperature storage performance and high-temperature cycle performance of lithium-ion batteries.

In an embodiment, the content of the chain segment a in the polymer is 15 wt % to 50 wt %, for example, 15 wt %, 18 wt %, 20 wt %, 25 wt %, 30 wt %, 35 wt %, 40 wt % or 50 wt %, etc.

In an embodiment, the content of the chain segment a in the polymer is 25 wt % to 40 wt %, for example, 25 wt %, 30 wt %, 35 wt %, 38 wt % or 40 wt %, etc.

In an embodiment, the content of the chain segment a in the polymer is 30 wt % to 35 wt %, for example, 25 wt %, 30 wt %, 32 wt %, 33 wt % or 35 wt %, etc.

In an embodiment, the weight average molecular weight of the polymer is 100000 to 1000000, for example, 100000, 200000, 300000, 400000, 500000, 650000, 800000 or 1000000, etc.

In an embodiment, the polymer is obtained by copolymerization of acrylonitrile, 1,3-butadiene, and an alkane including a 1-butene segment.

In an embodiment, the polymer is added in an amount of 1 wt % to 2 wt % in a positive electrode paste for forming the active substance layer.

In an embodiment, the mass ratio of the positive electrode active material, the binder, the conductive agent, and a solvent in the positive electrode paste is (70 to 80):(1 to 2):(1 to 2):(20 to 30), for example, 70:1:1:28, 72:2:2:24, 75:2:1:22 or 77:1:1:21, etc., and the binder is the polymer.

In an embodiment, the positive electrode active material is at least one selected from the group consisting of $LiCoO_2$, $LiNi_{1-\alpha-\beta}Co_\alpha Mn_\beta O_2$, $LiMn_2O_4$, $LiMnO_2$, $Li_2MnO_4$, $Li_2Mn_{1-\alpha}O_4$, $LiCo_{1-\alpha}M_\alpha O_2$, and $LiMn_{2-\beta}M_\beta O_4$, wherein M is at least one selected from the group consisting of Ni, Co, Mn, Al, Cr, Mg, Zr, Mo, V, Ti, B, F, and Y, the value range of a is 0 to 1 and the value range of β is 0 to 1.

In an embodiment, the content of cobalt in the positive electrode active material is 0 to 20 wt %, for example, 0, 0.1 wt %, 0.5 wt %, 1 wt %, 1.5 wt %, 2 wt %, 5 wt %, 8 wt %, 10 wt %, 15 wt % or 20 wt %, etc.

In an embodiment, the conductive agent is at least one selected from the group consisting of graphite, graphene, conductive carbon black, and a carbon nanotube.

In an embodiment, the solvent is N-methylpyrrolidinone and/or N,N-dimethylformamide.

In an embodiment, the current collector is an aluminum foil, and the thickness of the current collector is 10 μm to 13 μm, for example, 10 μm, 10.5 μm, 11 μm, 12 μm or 13 μm, etc.

In an embodiment provided by the present disclosure, the positive electrode plate has at least the following advantages: When the polymer including cyano-CN is applied to the positive electrode plate as a binder, in one aspect, the polymer including cyano-CN can be coated on the surface of the positive electrode active material, thereby reducing the contact area between the positive electrode active material and the electrolyte, inhibiting the dissolution of the transition metals from the positive electrode active material in the electrolyte, and significantly reducing the dissolution amount of the transition metals in the electrolyte; in another aspect, the cyano-CN in the polymer can complex transition metal ions dissolved in the electrolyte and fix the transition metal ions, avoiding the precipitation of the transition metal ions on the negative electrode and the resulting impedance increase. Compared with the related art, the positive electrode plate not only has low preparation cost, but also can effectively inhibit the reaction of the electrolyte on the surface of the electrode material, reduce the dissolution amount of metals from the positive electrode material in high-temperature environment, and slow down the occurrence of side reactions at the interface of the positive electrode during high-temperature storage and high-temperature cycling, thereby significantly improving the high-temperature storage performance and high-temperature cycle performance of lithium-ion batteries. The problem of the dissolution of metals from the positive electrode material is solved only by replacing binders, and the positive electrode plate can be more suitable for low-cobalt or cobalt-free positive electrode active materials.

The present disclosure provides a method for preparing the positive electrode plate in an embodiment. The method includes:

- mixing the positive electrode active material, the polymer, the conductive agent, and a solvent to obtain a positive electrode paste; and
- coating the positive electrode paste on a current collector to obtain the positive electrode plate.

In an embodiment of the present disclosure, the method for preparing the positive electrode plate can reduce the operation difficulty of improving the high-temperature storage performance and high-temperature cycle performance of batteries.

In an embodiment of the present disclosure, the method for preparing the positive electrode plate has at least the following advantages: the process is simple, the cost is low, the reaction of the electrolyte on the surface of the electrode material can be effectively inhibited only by replacing binders, the dissolution amount of metals from the positive electrode material in high-temperature environment is reduced, and the occurrence of side reactions at the interface of the positive electrode during high-temperature storage and high-temperature cycling is slowed down, thereby significantly improving the high-temperature storage performance and high-temperature cycle performance of lithium-ion batteries.

The present disclosure provides a lithium battery in an embodiment. The lithium battery includes the positive electrode plate described in the above-mentioned embodiment or a positive electrode plate prepared by the preparation method described in the above-mentioned embodiment.

In an embodiment provided by the present disclosure, the high-temperature performance of the lithium battery is improved.

In an embodiment provided by the present disclosure, the lithium battery has at least the following advantages: the dissolution amount of metals from the positive electrode material in a high-temperature environment is low, side reactions at the interface of the positive electrode during high-temperature storage and high-temperature cycling are reduced, the capacity retention rate of the battery is high, and the battery has the advantages such as good high-temperature storage performance, good high-temperature cycling performance, high safety, and long service life.

The present disclosure provides an energy storage device in an embodiment. The energy storage device includes the lithium battery described in the above-mentioned embodiment.

In an embodiment provided by the present disclosure, the energy storage device is improved in high-temperature storage stability, high-temperature cycling stability, safety, and service life.

The energy storage device exhibits stable performance at high temperatures.

DETAILED DESCRIPTION

The technical solutions of the present disclosure are further described below through the specific implementation.

The present disclosure provides a positive electrode plate in an embodiment. The positive electrode plate includes a current collector and an active substance layer formed on the current collector, wherein the active substance layer includes a positive electrode active material, a conductive agent, and a binder, the binder includes a polymer having a structural formula as shown in Formula I, and the polymer includes a chain segment a, a chain segment b, and a chain segment c, wherein the value of x, y, and z is determined by the degree of polymerization of the polymer, Formula I

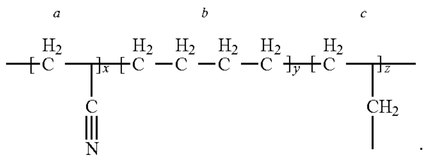

The inventors find that when the polymer including cyano-CN is applied to the positive electrode plate as a binder, in one aspect, the polymer including cyano-CN can be coated on the surface of the positive electrode active material, thereby reducing the contact area between the positive electrode active material and the electrolyte, inhibiting the dissolution of the transition metals from the positive electrode active material in the electrolyte, and significantly reducing the dissolution amount of the transition metals in the electrolyte; in another aspect, the cyano-CN in the polymer can complex transition metal ions dissolved in the electrolyte and fix the transition metal ions, avoiding the precipitation of the transition metal ions on the negative electrode and the resulting impedance increase, thus solves the problem of the dissolution of metals from the positive electrode effectively.

In an embodiment, the binder of the positive electrode plate may be replaced with the polymer having a structural formula as shown in Formula I.

In an embodiment of the present disclosure, the positive electrode plate not only has low preparation cost, but also can effectively inhibit the reaction of the electrolyte on the surface of the electrode material, reduce the dissolution amount of metals from the positive electrode material in a high-temperature environment, and slow down the occurrence of side reactions at the interface of the positive electrode during high-temperature storage and high-temperature cycling, thereby significantly improving the high-temperature storage performance and high-temperature cycle performance of lithium-ion batteries. The problem of the dissolution of metals from the positive electrode material is solved only by replacing binders, and the positive electrode plate can be more suitable for low-cobalt or cobalt-free positive electrode active materials.

In an embodiment, the polymer having a structural formula as shown in Formula I may be obtained by the copolymerization of acrylonitrile, 1,3-butadiene, and an alkane including a 1-butene segment, for example, by the copolymerization of acrylonitrile, 1,3-butadiene, and 1-butene, in which the chain segment a is formed from acrylonitrile, the chain segment b is formed from 1,3-butadiene, and the chain segment c is formed from the alkane including a 1-butene segment. It is to be noted that the polymer having a structural formula as shown in Formula I in the present disclosure may include a variety of addition reaction products with different degrees of polymerization.

In an embodiment, the content of the chain segment a in the polymer is 15 wt % to 50 wt %, for example, 5 wt %, 10 wt %, 15 wt %, 20 wt %, 25 wt %, 30 wt %, 35 wt %, 40 wt %, 45 wt % or 50 wt %, etc. The inventors find that if the content of the chain segment a in the polymer is too high, the impedance of the polymer becomes large, affecting the electrochemical performance of the battery; if the content of the chain segment a is too low, the content of cyano-CN becomes insufficient, not only the positive electrode active material cannot be masked, resulting in the failure to reduce the decomposition of the positive electrode active material on the electrolyte, but also the dissolved metals cannot be effectively fixed, causing the reduction reaction of the metals on the surface of the negative electrode and the increase of impedance. In the present disclosure, with the content of the chain segment a in the polymer controlled to be within the above-mentioned content range, the reaction of the electrolyte on the surface of the electrode material can be effectively inhibited, the dissolution amount of metals from the positive electrode material in high-temperature environment is reduced, and the occurrence of side reactions at the interface of the positive electrode during high-temperature storage and high-temperature cycling is slowed down, thereby significantly improving the high-temperature storage performance and high-temperature cycle performance of lithium-ion batteries.

In an embodiment, the content of the chain segment a in the polymer may be 25 wt % to 40 wt %.

In an embodiment, the content of the chain segment a in the polymer may be 30 wt % to 35 wt %, which can further improve the high-temperature storage performance and high-temperature cycle performance of lithium-ion batteries.

In an embodiment, the weight average molecular weight of the polymer may be 100000 to 1000000, for example, 100000, 150000, 200000, 300000, 400000, 500000, 600000, 700000, 800000, 900000 or 1000000, etc. The inventors find that if the weight average molecular weight of the polymer is too high, the viscosity of the polymer after dissolved is high, which is not helpful for the uniform dispersion of components during the preparation of the positive electrode paste; if the weight average molecular weight of the polymer is too small, the adhesion between the positive electrode active materials and the adhesion between the positive electrode active material and the current collector cannot be guaranteed. In the present disclosure, with the weight average molecular weight of the polymer to be within the above-mentioned range, a uniform and stable positive electrode paste can be obtained, and the positive electrode plate can obtain better adhesion, thereby further improving the uniformity and stability of the positive electrode plate and ensuring the quality of the positive electrode plate and the battery assembled therewith.

In an embodiment, the polymer is added in an amount of 1 wt % to 2 wt % in the positive electrode paste for forming the active substance layer, for example, 1.1 wt %, 1.2 wt %, 1.3 wt %, 1.4 wt %, 1.5 wt %, 1.6 wt %, 1.7 wt %, 1.8 wt %, 1.9 wt % or 2 wt %, etc. The inventors find that if the addition amount of the polymer is too low, in one aspect, the content of cyano-CN becomes insufficient, in this case, not only the positive electrode active material cannot be masked, resulting in the failure to reduce the decomposition of the positive electrode active material on the electrolyte, but also the dissolved metals cannot be effectively fixed, causing the reduction reaction of the metals on the surface of the negative electrode and the increase of impedance, and in another aspect, the adhesion between the positive electrode active materials and the adhesion between the positive electrode active material and the current collector are reduced; if the addition amount of the polymer is too high, the viscosity of the positive electrode paste is too high, which is not helpful for the uniform mixing of components, results in the increase of the impedance of the battery, and affects the electrochemical performance of the battery. In the present disclosure, with the addition amount of the polymer controlled to be within the above-mentioned range, the battery can have better high-temperature storage performance and high-temperature cycle performance.

In an embodiment, the mass ratio of the positive electrode active material, the binder, the conductive agent, and a solvent in the positive electrode paste may be (70 to 80):(1 to 2):(1 to 2):(20 to 30), and the binder is the polymer having a structural formula as shown in Formula I. The inventors find that, with the positive electrode paste controlled to be formed by the above-mentioned components and the components controlled to be in the above-mentioned ratio, the quality of the positive electrode plate can be further improved, the impedance can be significantly reduced, and the dissolution of metals from the positive electrode material in a high-temperature environment can be reduced, thereby further improving the comprehensive performance of the battery such as high-temperature storage performance and high-temperature cycle performance.

In an embodiment, the positive electrode active material may be at least one selected from the group consisting of $LiNi_{1-\alpha-\beta}Co_{\alpha}Mn_{\beta}O_2$, $LiCoO_2$, $LiMn_2O_4$, $LiMnO_2$, $Li_2MnO_4$, $Li_2Mn_{1-\alpha}O_4$, $LiCo_{1-\alpha}M_{\alpha}O_2$, and $LiMn_{2-\beta}M_{\beta}O_4$, wherein M may be at least one selected from the group consisting of Ni, Co, Mn, Al, Cr, Mg, Zr, Mo, V, Ti, B, F, and Y, the value range of $\alpha$ may be 0 to 1 and the value range of $\beta$ may be 0 to 1. Therefore, the electrochemical performance and cycle performance of the battery can be further ensured.

In an embodiment, the positive electrode active material may be a low-cobalt or cobalt-free positive electrode material. For example, the content of cobalt in the positive electrode active material may be 0 to 20 wt %.

In an embodiment, since the positive electrode active material is a cobalt-free positive electrode material, the positive electrode material can have excellent rate capability, cycle stability and other comprehensive performance, and the existing limitation of the source of scarce metal cobalt to the positive electrode plate can be overcome.

In an embodiment, the type of conductive agent in the present disclosure is not particularly limited and may be selected according to actual needs by those skilled in the art. For example, the conductive agent may be at least one selected from the group consisting of graphite, graphene, conductive carbon black, and a carbon nanotube.

In an embodiment, the solvent used for preparing the positive electrode paste may be N-methylpyrrolidinone and/or N,N-dimethylformamide.

In an embodiment, the current collector used for preparing the positive electrode plate may be an aluminum foil, and the thickness of the current collector may be 10 μm to 13 μm.

In an embodiment provided by the present disclosure, the positive electrode plate has at least the following advantages: when the polymer including cyano-CN is applied to the positive electrode plate as a binder, in one aspect, the polymer including cyano-CN can be coated on the surface of the positive electrode active material, thereby reducing the contact area between the positive electrode active material and the electrolyte, inhibiting the dissolution of the transition metals from the positive electrode active material in the electrolyte, and significantly reducing the dissolution amount of the transition metals in the electrolyte; in another aspect, the cyano-CN in the polymer can complex transition metal ions dissolved in the electrolyte and fix the transition metal ions, avoiding the precipitation of the transition metal ions on the negative electrode and the resulting impedance increase. Compared with the related art, the positive electrode plate not only has low preparation cost, but also can effectively inhibit the reaction of the electrolyte on the surface of the electrode material, reduce the dissolution amount of metals from the positive electrode material in a high-temperature environment, and slow down the occurrence of side reactions at the interface of the positive electrode during high-temperature storage and high-temperature cycling, thereby significantly improving the high-temperature storage performance and high-temperature cycle performance of lithium-ion batteries. The problem of the dissolution of metals from the positive electrode material is solved only by replacing binders, and the positive electrode plate can be more suitable for low-cobalt or cobalt-free positive electrode active materials.

The present disclosure provides a method for preparing the above-mentioned positive electrode plate in an embodiment. The method includes: mixing a positive electrode active material, a polymer, a conductive agent, and a solvent to obtain a positive electrode paste; and coating the positive electrode paste on a current collector to obtain the positive electrode plate.

In an embodiment of the present disclosure, the method for preparing the positive electrode plate has at least the following advantages: the process is simple, the cost is low, the reaction of the electrolyte on the surface of the electrode material can be effectively inhibited, the dissolution amount of metals from the positive electrode material in a high-temperature environment is reduced, and the occurrence of side reactions at the interface of the positive electrode during high-temperature storage and high-temperature cycling is slowed down, thereby significantly improving the high-temperature storage performance and high-temperature cycle performance of lithium-ion batteries.

In an embodiment, the positive electrode paste coated on the current collector may be dried and cut by rolling-slitting to obtain the positive electrode plate of the desired specification.

The present disclosure provides a lithium battery in an embodiment. The lithium battery includes the above-mentioned positive electrode plate or a positive electrode plate prepared by the above-mentioned preparation method.

In an embodiment provided by the present disclosure, the lithium battery has at least the following advantages: the dissolution amount of metals from the positive electrode material in a high-temperature environment is low, side reactions at the interface of the positive electrode during high-temperature storage and high-temperature cycling are reduced, the capacity retention rate of the battery is high, and the battery has the advantages such as good high-temperature storage performance, good high-temperature cycling performance, high safety, and long service life.

It is to be noted that the type of lithium battery in the present disclosure is not particularly limited. For example, the lithium battery may be a lithium battery with or without cobalt in the positive electrode.

The present disclosure provides an energy storage device in an embodiment. The energy storage device includes the above-mentioned lithium battery.

In an embodiment provided by the present disclosure, the energy storage device has stable performance at high temperature, high safety, and long service life.

It is to be noted that the type of the energy storage device in the present disclosure is not particularly limited and may be selected according to actual needs by those skilled in the art.

For example, the energy storage device may be a battery assembly or a device having a battery assembly, such as vehicles.

Typical but non-restrictive examples of the present disclosure are described below.

Example 1

(1) Preparation of a Positive Electrode Plate

The positive electrode plate included a current collector and an active substance layer formed on the current collector, wherein the active substance layer included a positive electrode active material, a binder, and a conductive agent. The positive electrode active material was $LiNi_8CoMnO_2$ (NCM811); the conductive agent was a combination of carbon black and carbon tubes; the binder was a polymer having the following structure, the content of the chain segment a in the polymer was 30 wt %, and the weight average molecular weight of the polymer was 800000, Formula I

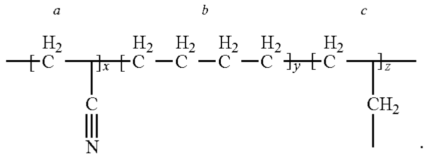

The method for preparing the positive electrode plate included the following steps. Firstly, a positive electrode paste was prepared, wherein the mass ratio of the positive electrode active material, the binder, the conductive agent, and the solvent in the paste was 75.5:1.2:1.3:22, wherein the solvent was N-methylpyrrolidinone. The positive electrode paste was coated on an aluminum foil, and the aluminum foil was dried and cut by rolling-slitting to obtain the positive electrode plate.

(2) Preparation of a Negative Plate

Graphite, a conductive agent superconducting carbon black (SP), a carboxymethylcellulose (CMC) glue solution (prepared by water and CMC), and water were mixed, and then a binder styrene-butadiene rubber (SBR) was added and mixed to prepare the negative electrode paste. The negative electrode paste was coated on a copper foil, and the copper foil was dried and cut by rolling-slitting to obtain the negative plate.

(3) Preparation of a Lithium Battery

The positive electrode plate, the negative plate, and a separator were prepared into a bare battery core by laminating. The bare battery core was welded with the Al and Ni electrode tabs respectively by ultrasonic welding and then placed in an aluminum-plastic film, and the film was filled with the electrolyte, stood for a period of time, and then sealed. The battery core was stood and aged at high temperature and room temperature, and formatted to obtain the lithium ion battery.

Example 2

Example 2 differed from Example 1 in that in step (1), the positive electrode active material in the positive electrode plate was $LiNi_6Co_2Mn_2O_2$ (NCM622).

Example 3

Example 3 differed from Example 1 in that in step (1), the content of the chain segment a in the polymer was 35 wt %.

Example 4

Example 4 differed from Example 1 in that in step (1), the weight average molecular weight of the polymer was 100000.

Example 5

Example 5 differed from Example 1 in that in step (1), the mass ratio of the positive electrode active material, the binder, the conductive agent, and the solvent in the positive electrode paste was 70.5:1.8:1.7:26.

Comparative Example 1

Comparative Example 1 differed from Example 1 in that in step (1), the binder was polyvinylidene fluoride (PVDF).

Comparative Example 2

Comparative Example 2 differed from Example 1 in that in step (1), the content of the chain segment a in the polymer was 60 wt %.

Comparative Example 3

Comparative Example 3 differed from Example 1 in that in step (1), the content of the chain segment a in the polymer was 10 wt %.

Comparative Example 4

Comparative Example 4 differed from Example 1 in that in step (1), the weight average molecular weight of the polymer was 50000.

Comparative Example 5

Comparative Example 5 differed from Example 1 in that in step (1), the mass ratio of the positive electrode active material, the binder, the conductive agent, and the solvent in the positive electrode paste was 70.5:3:1.7:24.8.

The positive electrode plates and lithium batteries prepared in Examples 1 to 5 and Comparative Examples 1 to 5 were evaluated.

1. The positive electrode plates prepared in Examples 1 and 4 and Comparative Example 4 were tested for adhesion.

The test results are shown in Table 2. As can be seen from the data, if the weight average molecular weight of the polymer was too small, after the positive electrode paste was coated on the current collector, the adhesion of the positive electrode plate was poor, while when the weight average molecular weight of the binder was 100000 to 1000000, the effective adhesion between the positive electrode active material and the current collector could be achieved.

2. The lithium-ion batteries prepared in Example 1 and Comparative Examples 2 and 5 were tested for direct current resistance (DCR).

The test temperature was 25° C., the charge-discharge rate was 1 C/1 C, and the test results are shown in Table 3. As can be seen from the data in Table 3, if the content of the chain segment a in the polymer was too high or the dosage of the binder was too much, the impedance of the battery increased, that is, the content of the chain segment a in the polymer and the dosage of the binder need to be appropriate, otherwise the impedance becomes large, and the resistance of the battery measured during direct current charging and discharging will be high.

3. The graded fresh batteries prepared in Examples 1, 2, 3, and 5 and Comparative Examples 1, 2, 3, and 5 and the batteries after 1200 cycles at high temperature cycle were tested for metal dissolution.

The method for testing metal dissolution is as follows: the battery was drained, the negative plate was disassembled, and the negative electrode material on the copper foil was scraped off for inductive coupled plasma (ICP) test.

The conditions of high-temperature cycling are as follows: the cycling was carried out at a temperature of 45° C., the charge-discharge rate was 1 C/1 C, and the cycle cut-off voltage was 2.5 V to 4.3 V.

The test results are shown in Table 4. As can be seen from the comprehensive comparison of Table 1 and Table 4,1) when the content of cobalt in the positive electrode active material was low, the dissolution amount of metals from the positive electrode material was high; 2) when the content of the chain segment a in the binder was low, the dissolution amount of transition metals from the positive electrode material was high; 3) compared with the conventional binder PVDF, the binder including cyano-CN in the present disclosure could significantly reduce the dissolution amount of transition metals from the positive electrode material; and 4) when the binder including cyano-CN was used in the preparation of the positive electrode plate and the content of the chain segment a and the dosage of the binder were appropriate, the content of metals measured on the negative electrode was low, and the capacity retention rate of the battery was also high after 1200 cycles at the high temperature under the same conditions.

To sum up, the schemes of the above-mentioned embodiments of the present disclosure can effectively inhibit the dissolution amount of transition metals from the positive electrode material and significantly improve the high-temperature cycle performance of the lithium-ion battery.

TABLE 1

Comparison among Examples 1 to 5 and Comparative Examples 1 to 5

| | Positive electrode active material | Type of the binder | Content of chain segment a in the polymer | Dosage of the binder | Weight average molecular weight of the polymer |
|---|---|---|---|---|---|
| Example 1 | NCM811 | Polymer including cyano | 30% | 1.2% | 800000 |
| Example 2 | NCM622 | Same as Example 1 | Same as Example 1 | Same as Example 1 | Same as Example 1 |
| Example 3 | Same as Example 1 | Same as Example 1 | 35% | Same as Example 1 | Same as Example 1 |
| Example 4 | Same as Example 1 | Same as Example 1 | Same as Example 1 | Same as Example 1 | 100000 |
| Example 5 | Same as Example 1 | Same as Example 1 | Same as Example 1 | 1.8% | Same as Example 1 |
| Comparative Example 1 | Same as Example 1 | PVDF | / | Same as Example 1 | / |
| Comparative Example 2 | Same as Example 1 | Same as Example 1 | 60% | Same as Example 1 | Same as Example 1 |
| Comparative Example 3 | Same as Example 1 | Same as Example 1 | 10% | Same as Example 1 | Same as Example 1 |
| Comparative Example 4 | Same as Example 1 | Same as Example 1 | Same as Example 1 | Same as Example 1 | 50000 |
| Comparative Example 5 | Same as Example 1 | Same as Example 1 | Same as Example 1 | 3% | Same as Example 1 |

TABLE 2

Adhesion of coated positive electrode plates

| Term | Weight average molecular weight of the polymer | Adhesion N/m |
|---|---|---|
| Example 1 | 800000 | 30 |
| Example 4 | 100000 | 12 |
| Example 4 | 50000 | 0.5 |

TABLE 3

Adhesion of coated positive electrode plates (50% SOC)

| Term | Content of chain segment a in the polymer | Dosage of the binder | Charging DCR | Discharging DCR |
|---|---|---|---|---|
| Example 1 | 30% | 1.2% | 10.5 mΩ | 10.3 mΩ |
| Example 2 | 60% | 1.2% | 12.6 mΩ | 12.5 mΩ |
| Example 5 | 30% | 3% | 16.3 mΩ | 16.2 mΩ |

TABLE 4

Dissolution amount of metals from the positive electrode material cathode and high-temperature cycle performance

| | Dissolution amount of metals after grading (μg/g) | | | Dissolution amount of metals after 1200 cycles at high temperature (μg/g) | | | Capacity after 1200 cycles at high temperature |
|---|---|---|---|---|---|---|---|
| | Ni | Co | Mn | Ni | Co | Mn | retention rate |
| Example 1 | 2 | 0.2 | 0.2 | 22 | 2 | 11 | 85% |
| Example 2 | 1 | 0.3 | 0.2 | 20 | 2 | 7 | 90% |
| Example 3 | 2 | 0.2 | 0.2 | 20 | 3 | 12 | 86% |
| Example 5 | 1 | 0.2 | 0.2 | 22 | 3 | 13 | 84% |
| Comparative Example 1 | 5 | 1 | 1 | 80 | 10 | 56 | 80% |
| Comparative Example 2 | 1 | 0.2 | 0.2 | 23 | 3 | 8 | 81% |

TABLE 4-continued

| Dissolution amount of metals from the positive electrode material cathode and high-temperature cycle performance | | | | | | | |
|---|---|---|---|---|---|---|---|
| | Dissolution amount of metals after grading (μg/g) | | | Dissolution amount of metals after 1200 cycles at high temperature (μg/g) | | | Capacity after 1200 cycles at high temperature |
| | Ni | Co | Mn | Ni | Co | Mn | retention rate |
| Comparative Example 3 | 3 | 0.8 | 0.8 | 60 | 12 | 30 | 81% |
| Comparative Example 5 | 1 | 0.5 | 0.5 | 20 | 3 | 6 | 83% |

What is claimed is:

1. A positive electrode plate, comprising a current collector and an active substance layer formed on the current collector, wherein the active substance layer consists of a positive electrode active material, a conductive agent, and a binder, the binder is a polymer having a structural formula as shown in Formula I, and the polymer comprises a chain segment a, a chain segment b, and a chain segment c, Formula I

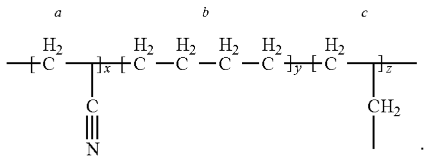

wherein the content of the chain segment a in the polymer is 30 wt % to 33 wt %;

the weight average molecular weight of the polymer is 100000 to 1000000;

the polymer is added in an amount of 1 wt % to 2 wt % in a positive electrode paste for forming the active substance layer;

a mass ratio of the positive electrode active material, the binder, the conductive agent, and a solvent in the positive electrode paste is (70 to 80):(1 to 2):(1 to 2):(20 to 30);

the positive electrode active material is $LiNi_{1-60\ -62}\ CO_{\alpha}Mn_{62}\ O_2$, a value range of $\alpha$ is 0 to 1 and a value range of $\beta$ is 0 to 1;

the conductive agent is a combination of conductive carbon black and carbon nanotube.

2. The positive electrode plate according to claim 1, wherein the polymer is obtained by copolymerization of acrylonitrile, 1,3-butadiene, and an alkane comprising a 1-butene segment.

3. The positive electrode plate according to claim 1, wherein the content of cobalt in the positive electrode active material is 0 to 20 wt %.

4. The positive electrode plate according to claim 1, wherein the solvent is N-methylpyrrolidinone and/or N,N-dimethylformamide.

5. The positive electrode plate according to claim 1, wherein the current collector is an aluminum foil, and the thickness of the current collector is 10 μm to 13 μm.

6. A method for preparing the positive electrode plate according to claim 1, comprising:

mixing the positive electrode active material, the polymer, the conductive agent, and a solvent to obtain a positive electrode paste; and coating the positive electrode paste on a current collector to obtain the positive electrode plate.

7. A lithium battery comprising the positive electrode plate according to claim 1.

8. An energy storage device comprising the lithium battery according to claim 7.

* * * * *